United States Patent Office 3,255,015
Patented June 7, 1966

3,255,015
PROCESS FOR SEPARATING THE ENZYMES AND NUTRITIVE CONSTITUENTS CONTAINED IN THE ENVELOPE AND CORTICAL LAYER OF CEREAL GRAINS
Etienne Blanchon, 85 Ave. de Villiers, Paris, France
No Drawing. Filed Apr. 23, 1962, Ser. No. 191,666
Claims priority, application France, Apr. 25, 1961, 859,799, Patent 1,295,462
4 Claims. (Cl. 99—9)

The present invention relates to a process for the treatment of the envelope and cortical layer of cereal grains for the purpose of separating the enzymes and nutritive constituents therefrom.

It is an object of the present invention to provide an improved process for the treatment of, for example, brans, for the purpose of releasing therefrom various nutritive and active substances such as for example, enzymes, enzyme activators, oligoelements and sugars. Such substances may be added to vegetable or animal food products for the purpose of improving the latter from a nutritive point of view and/or from the point of view of their assimilability by human, animal or plant organisms.

It is known to treat the envelopes and the cortical portions of grains, in general, and in particular the brans of cereals, by means of enzymes capable of hydrolyzing the pectic cements which ensure the adhesion of the heavily cutinised cellulosic walls which contain certain valuable nutritious elements. It is also known that germinating grains have diastasic powers which are exerted on the starches and proteins in the seeds.

Recent work carried out by the applicant and his co-workers has shown that it is possible to extract from the by-products of milling, i.e., the envelopes and proteic layer of the seeds, extremely varied ferments and also their activators and their catalysts, both organic and mineral. These ferments, or enzymes, are extremely numerous; among them there may be mentioned both glucidases and lipases, esterases and proteinases.

This work has made it possible to extract from the envelopes and the cortical portions of the seeds not only nutritive constituents of great value, but also diastases capable of facilitating the digestion thereof by living organisms and capable, moreover, of permitting the digestion of foods by the organisms in question. Thus, for example, the addition to milk of the lactase contained in wheat bran permits the digestion of that milk by suckling babies who cannot otherwise tolerate this food. From another aspect, the pectin esterase and the pectin polygalacturonase, also contained in brans, can be used to extract nutritive elements from plant tissues which have previously been used little or not at all as food because of their high content of inseparable cellulose which, as is known, deprives the organism of certain digestive principles essential to the human and/or animal organism.

In order to extract both the nutritive constituents and the enzymatic elements contained in plant tissues, such as seeds the processes known to date use diastases having a pectinolytic action which are obtained industrially from fungic or bacterial sources, or are obtained from seeds in process of germination.

These processes are costly for two reasons which are (1) the purchase of industrial diastases or the preparation of the extract of germinating seeds represents a relatively high and continually recurring expense and (2) the yield of biological extract, after treatment of the by-products, is insufficient because the recovery of the nutritive elements and of the enzymes liberated requires the use of many operations which involve considerable consumption of energy and the use of a large amount of labor.

The present invention has the aim of providing a process for the treatment of the envelope and cortical layer of cereal grains for the purpose of releasing the enzymes and nutritive constituents therefrom with a view to their use for improving foods intended for humans, animals and plants, which process can be carried into effect more readily than the processes known heretofore, and which process considerably reduces the cost of extracting and utilizing the nutritive and enzymatic substances contained in the cortical portions and the envelopes of grains of cereals which constitute the by-products of milling, and also permits rationalization of the treatment of the products.

The present invention has for its principal object to provide a process for the treatment of the envelope and cortical layer of cereal grains for the purpose of releasing the enzymes and nutritive constituents therefrom with a view, more particularly, to their use for improving foods intended for humans, animals and plants, which process is characterized in that the envelope and cortical layer of cereal grains are subjected to a continuous treatment by recycling the liquid rich in enzymes and other active substances which is obtained as a result of the treatment of an initial batch or charge, or of previous batches, of the envelope and cortical layer of cereal grains by means of enzymes.

According to a preferred embodiment of the invention, brans or the like, which have advantageously been subjected to prior grinding and to which there are added, preferably, 5 parts of water for one part of ground plant tissues, are treated by means of pectinolytic enzymes of industrial origin or of fungic or bacterial origin or else obtained from cereal brans by the process described in French Patent No. 1,245,574 filed on the April 3, 1959, in the name of Doctor Etienne Blanchon. The product obtained as a result of this treatment being then subjected to a process of separation, for example, by filtration or by decantation, to produce a filtrate and a residue of filtration, which filtrate gives in turn, by, for example, filtration or decantation, a residue and a supernatant liquid rich in enzymes and other active substances which is recycled over a fresh batch of ground envelope and cortical layer of cereal grains for the purpose of releasing from the latter the nutritive and active substances contained in them.

According to one advantageous arrangement of the preferred embodiment of the invention, the residue obtained as a result of the process of separation to which the product obtained by enzymatic treatment of the envelope and cortical layer of cereal grains is subjected, which residue contains essentially on the one hand cellulose strongly attacked by the enzymes contained in the plant tissues and, in particular, cellulase and hemicellulases, and, on the other hand, a part of the nutritive substances and the enzymes extracted from the plant tissues treated in accordance with the provisions of the invention, is added, either, per se, or after a preserving treatment, to food products such as cakes, or oil cakes, rich in cellulose, fish waste, etc., for the purpose of predigesting them and rendering them assimilable by the organisms which they are intended to feed.

According to a second advantageous arrangement of the preferred embodiment of the invention, the residue obtained as a result of the separating treatment of the filtrate originating from the first separating process, which residue contains essentially a part of the nutritive substances and the enzymes extracted from the plant tissues treated in accordance with the provisions of the invention, is added to food products, such as flours or meals, which are to be supplemented or treated, for instance, for the purpose of enriching said products with nutritive and active constituents and/or improving their assimilability by the organisms which they are intended to feed, in particular the human organisms.

It is advantageous to carry out the enzymatic treatment of the plant tissues under pH conditions of the order of 6 to 7 and under temperature conditions ranging between 20 and 35° C.

The residue obtained as a result of the separating treatment of the filtrate originating from the first process of separation may, with advantage, be added to microorganisms such as, for example, yeasts, either to form an adjuvant source of enzymes or to obtain a food having an exceptionally high nutrient value.

An embodiment of the invention will now be described by way of example.

Milling by-products which comprise the envelopes and the cortical portions of the grains, are first subjected to a grinding operation in a suitable apparatus, such as a hammer mill, disc mill or the like, after which the ground envelope and cortical layer of grains are mixed with water, preferably at the rate of 5 parts of water to 1 part of crushed milling by-products.

On the initial starting of the cyclic treatment, enzymes are added to the paste formed by the addition of 5 parts of water to 1 part of milling by-products, or to the water before the latter is added to the ground envelope and cortical layer of cereal grains, which enzymes may be of varied origin; in effect, they may be industrial enzymes of the type of rapidase or pectinol, and enzymes of fungic or bacterial origin which have desirable pectinolytic properties, or pectinolytic enzymes extracted from cereal brans, in accordance, for example, with the arrangements of the process forming the subject-matter of French Patent No. 1,245,574 already mentioned above, or by any other suitable means.

The paste containing enzymes obtained in this way is maintained at a temperature which, in the case of milling by-products, is advantageously of the order of 20 to 35° C., and at a pH value which is advantageously of the order of 6 to 7. The duration of contact between the paste and the enzymes, that is to say the length of time during which the enzymatic treatment of the milling by-products is allowed to be performed, is advantageously of the order of 1½ to 2 hours.

After allowing the enzymes to act on the milling by-products for the desired time, the separation of the constituents of the plant tissues is carried out by filtration or decantation.

The separation is conducted in such manner that the content of active substances, such as enzymes, for instance, of the separated liquid is of the order of 50% of the quantity theoretically extractable, so that there remains in the cellulose constituting the residue of filtration, decantation or the like, also about 50% of nutritive and active substances. It is possible to adjust the respective contents of active products in the liquid and the residue by adjusting the temperature and pressure conditions, the duration of the separating process and by perfecting the separation conditions by means of control tests such as, for example, determination of the dry extract.

The liquid obtained as a result of the separating process which has just been described is subjected to another separating process by filtration, decantation or the like, as a result of which a residue and a liquid are recovered.

The liquid obtained as a result of this second separating process is recycled in order to treat a fresh batch of ground milling by-products, thus rendering unnecessary any fresh addition of new enzymes for treating the envelope and cortical layer of cereal grains, inasmuch as the pectinolytic enzymes required for opening up the "cells" of cellulose in the envelopes and cortical portions of the grains for the purpose of releasing the enzymes and nutritive constituents contained therein are contained in the recycled liquid. This recycling of liquid thus establishes a continuous cyclic treatment.

It will be readily understood that, in order for the paste to always have a ratio of one part of ground plant tissues to 5 parts of liquid, it will be necessary to add to the ground envelope and cortical layer of cereal grains a quantity of water which completes the proportion of recycled liquid, so as to obtain a proportion of 5 parts of liquid for one part of the envelope and cortical layer of cereal grains.

Moreover, the residue obtained from the process of separation of the treated envelope and cortical layer of cereal grains, which residue contains on the one hand the cellulose from which the enzymatic treatment has released the nutritive and enzymatic substances which it contained, and which is already strongly attacked by the cellulase and the hemicellulases of the plant tissues, and by about 50% of nutritive and enzymatic substances, by reason of the conditions under which the process of separation has been conducted, is added to food products and more particularly to products intended for feeding animals, in particular herbivorous animals. The addition of the aforesaid residue to food products such as cakes, and in particular cakes rich in cellulose, and to fish waste is intended to effect a predigestion of these difficulty assimilable products, which is effected by the enzymes contained in said residue.

The addition of the residue originating from the process of separation of the envelope and cortical layer of cereal grains subjected to the enzymatic treatment in accordance with the provisions of the invention, to the food products to be predigested may take place immediately after said residue has been obtained. It may also be effected with advantage by a user such as, for example, a manufacturer of food products or breeder or farmer, in which case, immediately after the residue has been obtained, it is subjected either to drying under vacuum or to a lyophilization, which enables it to be stored. At the time of use, the dry residue is added to the food products to be predigested together with a sufficient quantity of water, while maintaining the temperature, pH and time conditions adapted to enable it to exert the effects expected thereof. The residue originating from the process of separation may likewise be added to yeasts or to other microorganisms likely to be of interest as an adjuvant source of diastases, or for the purpose of obtaining a food having an exceptionally high nutritive value. In this connection, reference is made to the theory of yeast food.

Moreover, the residue which is left as a result of the separating treatment to which the filtrate obtained as a result of the process of separation is subjected is also utilized for the purpose of improving food products. This residue, which contains a certain proportion of nutritive and enzymatic substances, is added to food products intended for feeding both humans and animals or even plants, such as flours or meals and cakes, in order to enrich said products and, if necessary, to improve their assimilability.

This residue may be utilized immediately, that is to say it may be added, immediately after it has been obtained, to the particular food products, or utilized after a length of time, which presupposes that immediately after the residue has been obtained it is subjected to e.g., vacuum drying or to a lyophilization treatment, for the purpose of storing it and using it later on.

It will appear from the foregoing description that, whatever the embodiments adopted, the invention provides a process for the treatment of the envelope and cortical layer of cereal grains for the purpose of releasing the nutritive and enzymatic constituents therefrom, with a view, more particularly, to their use for improving foods intended for humans, animals and plants, which affords many advantages with respect to prior art methods, and in particular permits the simultaneous preparation of: (1) a medium rich in enzymes for the continuous cyclic enzymatic treatment of the envelope and cortical layer of cereal grains for the purpose of releasing the nutritive and enzymatic substances contained therein; (2) a nutritive extract containing partially degraded cellulose rich in nutritive and enzymatic substances which is suitable for feeding animals and, in particular, for feeding herbivorous animals; and (3) a decellulosed nutritive extract suitable for feeding both humans and animals and which may, if required, be incorporated in preparations for treating plants.

As regards the incorporation of the above-mentioned extracts in preparations for the treatment of plants, it is possible to utilize either residues containing cellulose and about 50% of the theoretically extractable quantity of nutritive and enzymatic substances, and resulting from the process of separation of the product obtained by enzymatic treatment of the envelope and cortical layer of cereal grains, or decellulosed residues rich in nutritive and enzymatic substances, resulting from the separating treatment of the filtrate originating from the process of separation of the product obtained by enzymatic treatment of the envelope and cortical layer of cereal grains.

These nutritive and active extracts are absorbed, according to how they are applied, either by the roots or the leaves of the plants.

For the treatment of plants, the aforesaid residues may with advantage, be combined with a carrier such as glycogen, carbon, graphite or lignite, which may or may not be in the colloidal state.

According to an advantageous method of applying the preparations, in the particular case, for example, of so-called "soil-less" plants, there is added to the nutritive solutions currently used in agriculture about 10% of a suspension of 5% of lignite in the decellulosed residue resulting from the separating treatment of the filtrate originating from the process of separation of the product obtained by enzymatic treatment of the envelope and cortical layer of cereal grains.

I claim:

1. A process for separating the enzymes and nutritive constituents contained in the envelope and cortical layer of cereal grains which comprises subjecting said envelope and cortical layer to enzymatic action whereby the cellulose is degraded and enzymes are liberated, separating the so-obtained mixture into a filtrate and a cellulose residue, separating the so-obtained filtrate into a pectinolytic enzyme-rich supernatant liquid and a residue, and recycling and mixing the pectinolytic enzyme-rich supernatant liquid with a fresh batch of the envelope and the cortical layer of cereal grains, thereby releasing the enzymes and nutritive constituents contained in said envelope and cortical layer.

2. A process for separating the enzymes and nutritive constituents contained in the envelope and cortical layer of cereal grains which comprises adding water to said envelope and cortical layer to form a paste, subjecting the so-obtained paste to enzymatic action by mixing therewith a pectinolytic enzyme and maintaining the temperature at from 20 to 35° C. and the pH at from 6 to 7 of the so-obtained mixture, separating the so-obtained mixture into a filtrate and a cellulose residue, separating the so-obtained filtrate into a pectinolytic enzyme-rich supernatant liquid and a residue, and recycling and mixing the pectinolytic enzyme-rich supernatant liquid with a fresh batch of the envelope and the cortical layer of cereal grains, thereby releasing the enzymes and nutritive constituents contained in said envelope and cortical layer.

3. A process for separating the enzymes and nutritive constituents contained in the envelope and cortical layer of cereal grains which comprises adding water to said envelope and cortical layer to form a paste, subjecting to the so-obtained paste to enzymatic action by mixing therewith a pectinolytic enzyme and maintaining the temperature at from 20 to 35° C. and the pH at from 6 to 7 of the so-obtained mixture, separating the so-obtained mixture into a filtrate and cellulose residue so that about 50% of the enzymes and nutritive constituents contained in said envelope and cortical layer remains in the cellulose residue while the other 50% is in the filtrate, separating the so-obtained filtrate into a pectinolytic enzyme-rich supernatant liquid and a residue, and recycling and mixing the pectinolytic enzyme-rich supernatant liquid with a fresh batch of the envelope and the cortical layer of cereal grains, thereby releasing the enzymes and nutritive constituents contained in said envelope and cortical layer.

4. A process for separating the enzymes and nutritive constituents contained in the envelope and cortical layer of cereal grains which comprises adding 5 parts water to 1 part of said envelope and cortical layer to form a paste, subjecting the so-obtained paste to enzymatic action by mixing therewith a pectinolytic enzyme and maintaining the temperature at from 20 to 35° C. and the pH at from 6 to 7 of the so-obtained mixture, separating the so-obtained mixture into a filtrate and cellulose residue so that about 50% of the enzymes and nutritive constituents contained in said envelope and cortical layer remains in the cellulose residue while the other 50% is in the filtrate, separating the so-obtained filtrate into a pectinolytic enzyme-rich supernatant liquid and a residue, and recycling and mixing the pectinolytic enzyme-rich supernatant liquid with a fresh batch of the envelope and the cortical layer of cereal grains, thereby releasing the enzymes and nutritive constituents contained in said envelope and cortical layer.

References Cited by the Examiner

UNITED STATES PATENTS

| 2,881,075 | 4/1959 | Lockmiller et al. | 99—9 |
| 2,903,399 | 9/1959 | Dixon | 195—115 |
| 3,058,890 | 10/1962 | Muira et al. | 195—62 |

A. LOUIS MONACELL, *Primary Examiner.*

D. J. DONOVAN, *Assistant Examiner.*